T. D. WARE.
MACHINE FOR DISTRIBUTING DRY INSECTICIDES OR LIKE MATERIALS.
APPLICATION FILED APR. 2, 1908.
912,635.
Patented Feb. 16, 1909.
2 SHEETS—SHEET 1.
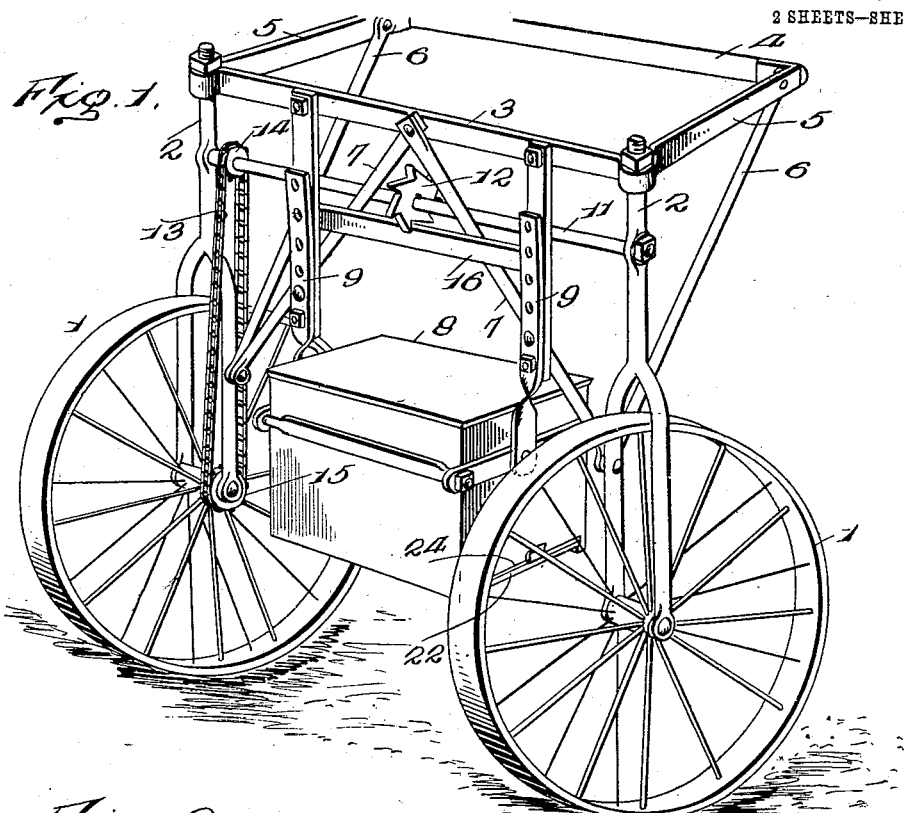
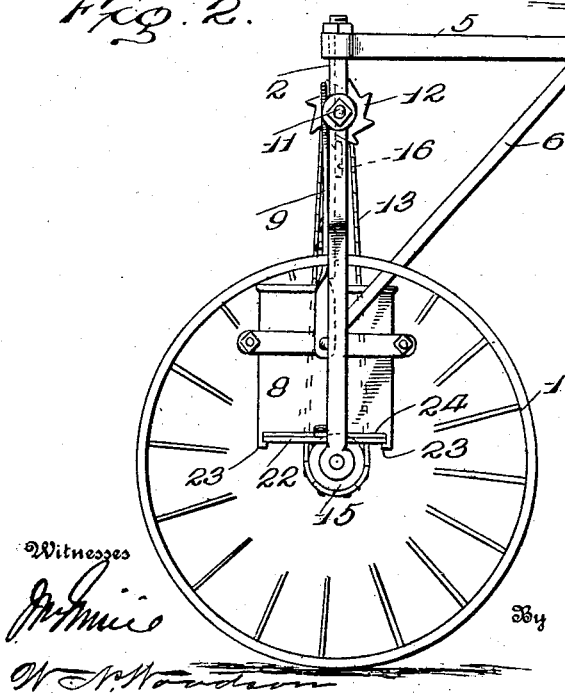
Witnesses
Inventor
T. D. Ware
By
Attorneys T. D. WARE.
MACHINE FOR DISTRIBUTING DRY INSECTICIDES OR LIKE MATERIALS.
APPLICATION FILED APR. 2, 1908.
912,635.
Patented Feb. 16, 1909.
2 SHEETS—SHEET 2.
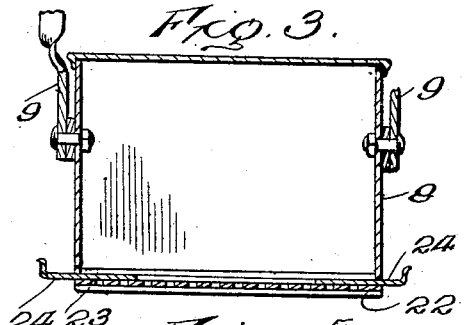
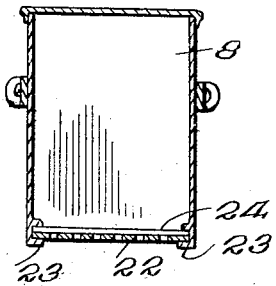
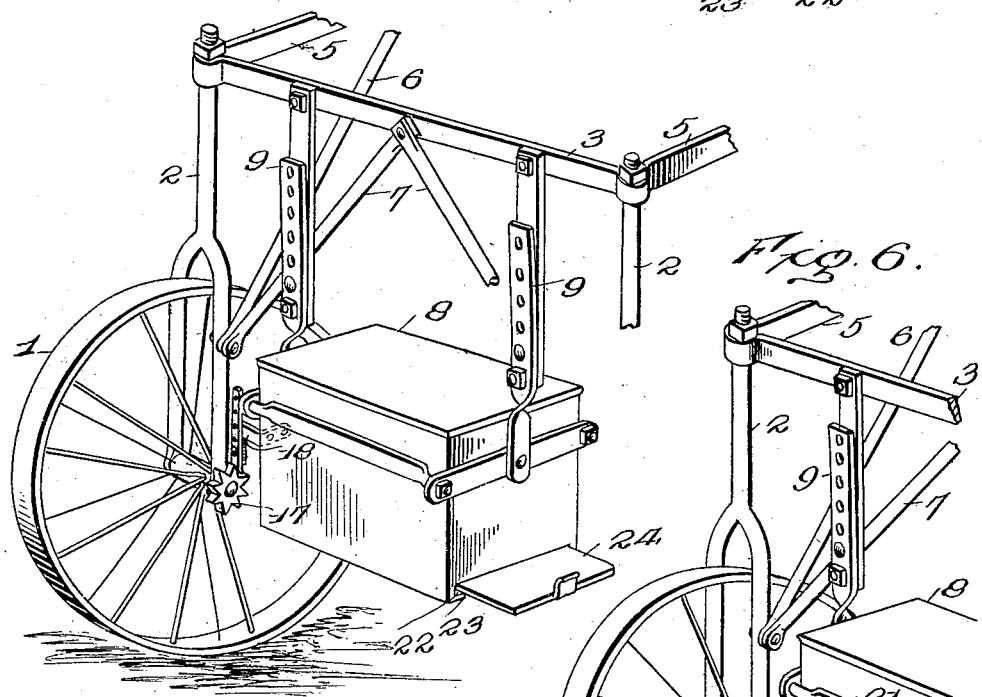
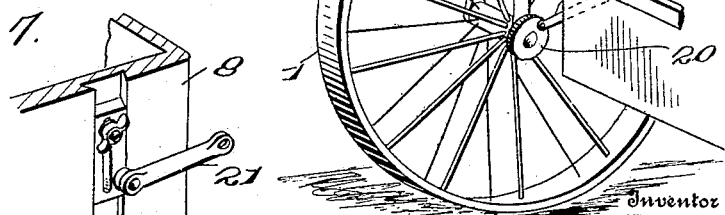

UNITED STATES PATENT OFFICE.

THOMAS D. WARE, OF MILESBURG, PENNSYLVANIA.

MACHINE FOR DISTRIBUTING DRY INSECTICIDES OR LIKE MATERIALS.

No. 912,635.  Specification of Letters Patent.  Patented Feb. 16, 1909.

Application filed April 2, 1908. Serial No. 424,810.

*To all whom it may concern:*

Be it known that I, THOMAS D. WARE, citizen of the United States, residing at Milesburg, in the county of Center and State of Pennsylvania, have invented certain new and useful Improvements in Machines for Distributing Dry Insecticide or Like Materials, of which the following is a specification.

The present invention provides a mechanism particularly designed for scattering an insecticide upon plants and which may be advantageously used for distributing fertilizer or for carrying barrels or other articles.

The machine embodies a truck which may either be drawn by hand or horse power, a box or like receptacle mounted upon the truck and adapted to contain the pulverulent material to be distributed and having a perforated bottom for scattering said material broadcast either upon the plants or upon the ground according to the particular adaptation of the invention, and means for imparting a shaking movement to the box or receptacle to effect delivery of the material as the machine is advanced over the field.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a machine embodying the invention and adapted for distributing material in finely divided state. Fig. 2 is a side view of the machine. Fig. 3 is a vertical longitudinal section of the box or receptacle for receiving the finely divided material to be distributed. Fig. 4 is a transverse section of the box. Fig. 5 is a perspective view of a modification. Fig. 6 is a perspective view of a further modification. Fig. 7 is a detail view, showing the means for connecting the pitman to the receptacle or box to admit of the vertical adjustment of the latter.

Corresponding and like parts are referred to in the following description and indicated in all the views of the drawings by the same reference characters.

The truck may be of any construction depending upon the particular manner of its use, whether to be drawn over the field by hand, or by horse power. As shown, the truck embodies ground wheels 1, forked standards 2, a transverse bar 3 connecting the upper ends of the standards 2, a handle bar 4 located in front of and parallel with the cross bar 3, longitudinal bars 5 connecting the bars 3 and 4, and braces 6 and 7. The braces 6 extend from the front ends of the longitudinal bars 5 to a fork of the respective standards 2. The braces 7 extend from the cross bar 3 to the inner members of the forked standards 2.

One of the ground wheels 1 is utilized as a driver for imparting a shaking movement to a box or receptacle 8 mounted upon the truck frame. Various means may be employed for transmitting a vibratory or shaking movement to the box, some of which are indicated in the drawings. Hangers 9 adjustably connect the box 8 with the cross bar 3, each of said hangers being composed of two sections or bars which are adjustably connected to admit of the raising or lowering of the box according to the height of the plants to be supplied with an insecticide. As indicated in Fig. 1, a shaft 11 is journaled at its ends in the forked standards 2 and is supplied with a tappet wheel 12 fast thereto. A sprocket chain 13 connects a sprocket wheel 14 fast to the shaft 11 with a sprocket wheel 15 connected with the ground wheel used as a driver. A cross bar 16 connects the hangers 9 and is adapted to be engaged by the teeth of the tappet wheel 12 so as to impart a shaking or oscillatory movement to the box in the movement of the machine over the field.

In the construction shown in Fig. 5, a tappet wheel 17 is fast to the axle of the drive wheel and its teeth are adapted to engage with an arm 18 projected from the box 8, the parts being so arranged as to insure a positive vibratory movement of the box in the travel of the machine over the field.

In the construction shown in Fig. 6, the axle of the drive wheel is provided with a crank 20 which is connected by means of a pitman 21 with the box 8 and as the machine is drawn over the field, the movement of the crank 20 through the pitman 21 imparts an oscillatory movement to the box or receptacle 8. In order that the box or receptacle may be adjusted vertically it is necessary that the pitman 21 be connected thereto in a manner to admit of its adjustment. This is accomplished by the construction shown in Fig. 7, in which the pitman is connected to a slide, which is adjustably connected to the box or receptacle by means of a suitable fastening.

The bottom of the box or receptacle 8 is perforated for the escape of the powder or dry material in pulverulent form. In order that the machine may be adapted for various uses, the bottom 22 of the box or receptacle 8 is made removable and is slid into guides 23. Different bottoms are provided, each having openings of different sizes. Slides 24 are provided to coöperate with the perforated bottom of the box to cut off or cover more or less of the perforations so as to regulate the track or width of the surface of the ground or plants to be supplied with the material. The slides 24 are slipped into the guides 23 from opposite ends of the box.

According to the particular work to be performed, a bottom 22 is selected having openings of the size best adapted to the material to be distributed, said bottom being slipped into the guides 23. After the box or receptacle has been supplied with the material to be scattered, the machine is drawn over the field, the box having a shaking or vibratory movement imparted thereto in the manner stated. It is to be understood that the truck may be utilized for carrying a barrel or other form of load or device, by removing the box 8, suitable means being employed to connect the barrel or other device to the truck.

Having thus described the invention, what is claimed as new is:

1. In combination, standards having ground wheels at their lower ends, a cross bar connecting the upper ends of the standards, a handle bar, means connecting said handle bar with the standards and cross bar, a receptacle suspended from said cross bar and adapted to contain material to be distributed, and means for imparting a shaking movement to the receptacle from one of the ground wheels.

2. In combination, standards provided at their lower ends with ground wheels, a cross bar connecting the upper ends of the standards, longitudinal bars projected from said cross bar, a handle bar connecting the outer ends of said longitudinal bars, braces between the outer ends of said longitudinal bars and the standards, other braces between said standards and the aforesaid cross bar, a receptacle having a perforated bottom and adapted to receive finely divided material, means suspending said receptacle from the aforesaid cross bar, and means for imparting a shaking movement to the receptacle from one of the ground wheels.

3. In combination, standards provided at their lower ends with ground wheels, a cross bar connecting the upper ends of the standards, a handle bar having connection with said standards and cross bar, a receptacle suspended from the cross bar, a shaft mounted in the upper portions of the standards, a tappet fast to said shaft and adapted to impart a vibratory movement to the aforesaid receptacle, and means for imparting rotary movement to the shaft from one of the ground wheels.

4. In combination, standards forked at their lower ends, ground wheels mounted in the forks of the standards, a cross bar connecting the upper ends of the standards, longitudinal bars projected from the cross bar, a handle bar connecting the outer ends of the longitudinal bars, braces between the outer ends of the longitudinal bars and the forked ends of the standards, other braces between the cross bar and the forked ends of the standards, a receptacle having a perforated bottom, adjustable hangers connecting said receptacle with the cross bar, a shaft mounted in the upper portions of the forked standards, a tappet fast to said shaft and adapted to engage with the receptacle suspending means to impart a shaking movement to the receptacle, and means for imparting rotary movement to said shaft from one of the ground wheels.

In testimony whereof I affix my signature in presence of two witnesses.

THOMAS D. WARE. [L. S.]

Witnesses:
O. D. BUSH,
D. L. WILSON.